United States Patent [19]
Fremouw et al.

[11] 3,769,585
[45] Oct. 30, 1973

[54] METHOD AND APPARATUS FOR EARTH-SPACE RANGE MEASUREMENTS EMPLOYING CORRECTION FOR IONOSPHERIC GROUP DELAY

[75] Inventors: Edward Joseph Fremouw, Palo Alto; Alan Alexander Burns, Jr., Berkeley, both of Calif.

[73] Assignee: Stanford Research Institute, Menlo Park, Calif.

[22] Filed: Feb. 22, 1971

[21] Appl. No.: 117,606

[52] U.S. Cl. .................................. 325/67, 325/363
[51] Int. Cl. ............................................ H04b 1/00
[58] Field of Search ................. 325/42, 40, 65, 60, 325/67, 473, 474, 305, 323, 328, 363; 343/112 D; 179/15 BP

[56] References Cited
UNITED STATES PATENTS

| | | | |
|---|---|---|---|
| 2,955,199 | 10/1960 | Mindes | 325/305 |
| 3,492,579 | 1/1970 | Carassa | 325/67 |
| 3,461,452 | 8/1969 | Welter | 325/67 |
| 3,537,008 | 10/1970 | Lakatos | 325/65 |
| 3,230,453 | 1/1966 | Boor et al | 325/67 |
| 3,123,772 | 3/1964 | Gerks | 325/65 |

*Primary Examiner*—Albert J. Mayer
*Attorney*—Lindenberg, Freilich & Wasserman

[57] ABSTRACT

Excess ionospheric group-delay correction by direct measurement along the transmission path of VHF signals employed for range finding is achieved by transmitting a signal having a triad of frequencies $f+f_m$, $f$ and $f-f_m$. The triadic frequencies are first separated at the receiver. The frequency $f$ is then mixed with each of the other two to obtain two differences. The phase difference $\Delta_2\phi$ between the two differences, i.e., the second difference of phase shift versus frequency, a measure of dispersion, is proportional to the integral of electron density along the path and, therefore, to excess ionospheric group delay. To make range corrections, the relationship of $\Delta_2\phi$ to $\Delta T$ (given at $\Delta T = f 4\pi f_m^2 \Delta_2\phi$) is used.

6 Claims, 2 Drawing Figures

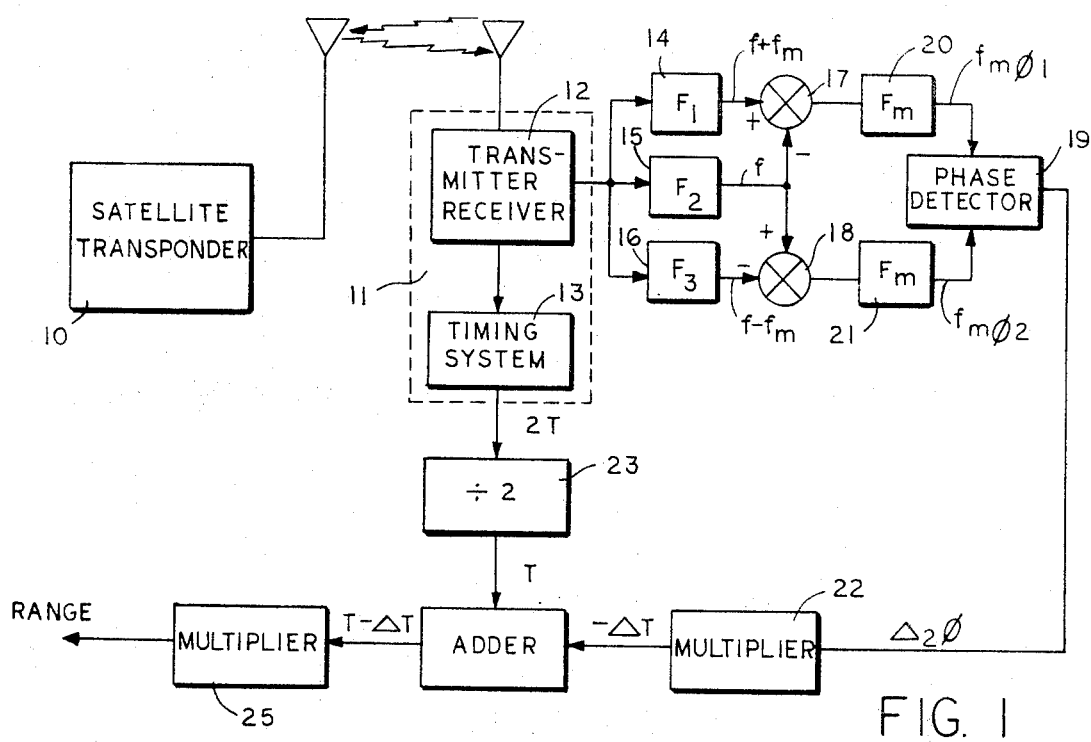
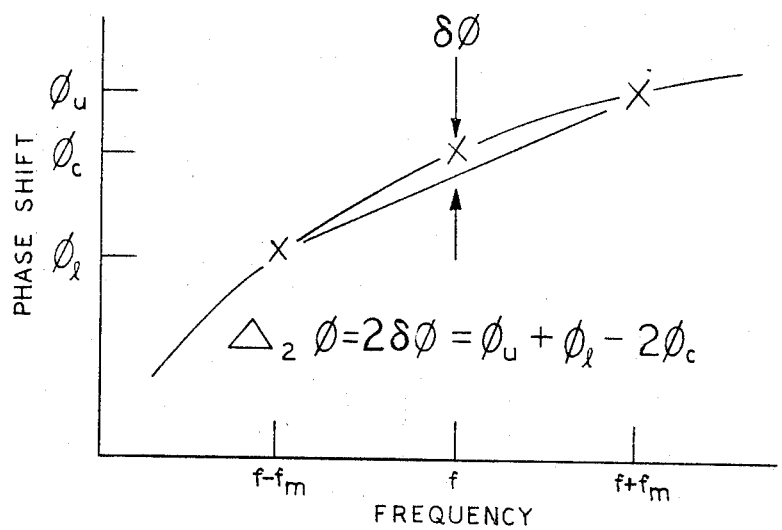
$$\triangle_2 \phi = 2\delta\phi = \phi_u + \phi_l - 2\phi_c$$
FIG. 2
INVENTORS.
EDWARD J. FREMOUW
ALAN A. BURNS
BY *Lindenberg, Freilich & Wasserman*
ATTORNEYS.

METHOD AND APPARATUS FOR EARTH-SPACE RANGE MEASUREMENTS EMPLOYING CORRECTION FOR IONOSPHERIC GROUP DELAY

BACKGROUND OF THE INVENTION

This invention relates to a technique for making corrections in ranging systems operating at sufficiently low frequencies to experience significant excess group delay in dispersive media such as excess ionospheric group delay in the radio spectrum, and more particularly to a technique for making a direct and accurate estimate of excess group delay along a transmission path in dispersive media while a range measurement is being made in order to correct the range measurement without delay.

Radio ranging systems are based upon measuring the group delay of a signal between two points of interest at a known group (energy propagation) velocity. In the case of a transatmospheric radio path at frequencies significantly above the plasma frequency of the ionosphere, the biggest uncertainty in such a measurement arises from uncertainty in the atmospheric refractive index governing the group velocity.

Two distinctly different atmospheric regions are traversed by a radio wave propagating between the earth's surface and satellite altitudes. The troposphere has a refractive index that is independent of the observing frequency in the band of interest here, and that departs from unity by only a few parts of $10^4$ or less. In contrast, the ionospheric refractive index is frequency dependent and its departure from unity may approach a percent or so at frequencies of interest for VHF ranging.

The foregoing, and the fact that the ionosphere is many times as thick as the troposphere, make the ionosphere much more important than the troposphere in producing uncertainty in VHF satellite range measurements. The excess group delay suffered by a radio wave propagating vertically through the troposphere is typically a few meters and can be estimated without real-time observation to a fraction of a meter. Under the same conditions, the ionospheric group delay often may be several kilometers at VHF with an attendant increase in uncertainty. Accordingly, this invention is concerned primarily with excess ionospheric group delay, but is also applicable in dispersive media other than the ionosphere and at electromagnetic wave-lengths other than in the radio spectrum.

Several systems utilizing precise ranging to two or more artificial satellites have been considered for navigation and position control of ships and aircraft. However, it has been determined that at VHF the excess ionospheric group delay can introduce a significant error; the possibility of using ranging systems of yet higher frequency to reduce the error is to be avoided for economic rather than technical reasons. Therefore, to improve the accuracy of a VHF ranging system to that of a higher-frequency system, it is necessary to provide correction in real time for excess group delay along the propagation path. That requires a correction based on an accurate estimate of excess ionospheric group delay made at the same location and at substantially the same time as a range measurement, rather than on ionospheric predictions or extrapolations from direct measurements or estimates made on paths remote from that of the range measurement.

Group delay ($T$) is simply the time taken for electromagnetic energy to travel from one point to another, $R$ meters away. That is $$T = \frac{1}{c}\int_0^R n\,ds \qquad (1)$$

where $c$ is the speed of light in vacuum and $n$ is the group refractive index of the medium. Group delay is proportional to the first derivative of phase shift with respect to frequency. The excess group delay $\Delta T$ over a propagation path, relative to that over the same path in free space, is $$\Delta T = \frac{1}{c}\int_0^R (n-1)\,ds = \frac{1}{c}\int_0^R \Delta n\,ds \qquad (2)$$

For VHF propagation in the ionosphere, $$\Delta n \approx e^2 N/8\pi^2\epsilon_o m f^2 = 40.3 N/f^2 \qquad (3)$$

where
$e$ = Electron charge,
$m$ = Electron mass,
$\epsilon_o$ = Permitivity of free space,
$N$ = Electron density, in electrons per cubic meter, and
$f$ = Frequency of electromagnetic wave, in Hertz.

Combining Equations (2) and (3), one obtains the following for excess ionospheric group delay (by which we mean the excess over free-space group delay):

$$\Delta T = e^2/8\pi^2\epsilon_o mc\ N_T/f^2$$
$$= 1.34 \times 10^{-7}\ N_T/f^2 \qquad (4)$$

where $$N_T = \int_0^R N\,ds$$

Thus excess group delay is directly proportional to the integrated electron density, $N_T$ (electrons per square meter column), along the path. The second derivative of phase shift with respect to frequency, a measure of dispersion, is similarly related to $N_T$.

To give an idea of the magnitude of the quantities involved, we note that $\Delta T = 0.5\mu s$ (a range error of 150m) at 135 MHz for $N_T \approx 7.5 \times 10^{16}$ electrons/$m^2$, a value almost invariably exceeded daily. With $N_T = 10^{19}$ electrons/$m^2$ (about the largest ever expected—at subequatorial latitudes during sunspot maximum) $\Delta T \approx 70\ \mu s$ at 135 MHz, corresponding to a range error of 21 km. Since $\Delta T = 0.5\ \mu s$ seems to be about the resolution desired from ranging navigation systems, the ionospherically produced errors are very serious at VHF.

It is obvious from the foregoing that knowledge of integrated electron density along the propagation path of interest is necessary and sufficient information for correcting range measurements for ionospheric group delay. Rather extensive measurements of ionospheric "total electron content," usually expressed in terms of $N_T$ for a vertical path, have been carried out by many ionospheric physicists.

One means of performing a group-delay correction might be to use existing total-electron-content information as an estimate of $N_T$ along the path of interest. A somewhat better approach would be to establish a network of total-electron-content-measuring stations, providing data that could be interpolated and geometrically corrected for applications to paths of interest. A third approach would be to perform direct measurements of $N_T$ along the paths of interest; only the third approach would provide correction in real time with high accuracy. The apparent lack of a simple, direct, accurate and unambiguous method for measuring excess ionospheric group delays along the ranging path has led others to consider the alternate approaches. However, these other approaches do not appear to possess sufficient accuracy to meet requirements and thus not thought satisfactory.

To provide correction according to the third approach in a VHF system, Perry I Klein proposed in a letter published in the *Proceedings of the IEEE*, vol. 57, pp. 1,768–1769, Oct. 1969, that a two-carrier-frequency differential group delay technique be used. That technique assumes that the range error due to ionospheric refraction is inversely proportional to the square of carrier frequency, and that higher order refraction terms are negligible. The differential in the group delay at the two frequencies then would be used to correct the range measurement.

SUMMARY OF THE INVENTION

An object of this invention is to provide a method and apparatus for measuring excess group-delay of the signal through a dispersive propagation medium including, but not limited to, transionospheric propagation of short radio waves.

Another object is to provide an improved method and apparatus for correction of excess group-delay range errors in a ranging system relying on transmission of a signal through dispersive media.

These and other objects are applied to a ranging system for accurately estimating the distance between two points, separated by a dispersive propagation medium, based on measurement of the travel time of a signal. The measured travel time T will be in error by an unknown and varying amount $\Delta T$ due to reduced signal propagation velocity in the medium (as compared with that in a standard medium such as free space in the case of transionospheric propagation). By measuring the second difference of phase shift along the propagation path, the error $\Delta T$ is obtained through a conversion factor. The measurement is made by transmitting a triad of frequencies along with a ranging signal from one point, separating the frequencies in the receiver at the second point, mixing the separated frequencies with each other to obtain two difference signals of the same frequency, and detecting the phase difference between the two difference signals as the desired measurement of the second difference of phase shift over the path travelled by the multifrequency signal from the transmitter to the receiver. The measured value of second difference of phase shift is multiplied by a conversion factor, and the product $\Delta T$ is subtracted from the measured T. The difference $(T-\Delta T)$ is then multiplied by the signal propagation velocity in the standard medium to determine range.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a block diagram of a system for earth-space range measurements according to the present invention.

FIG. 2 is a graph, of signal phase shift due to ionospheric group delay as a function of frequency, useful in understanding the present invention.

DESCRIPTION OF THE PREFERRED EMBODIMENTS

Referring now to FIG. 1, a ground-to-satellite ranging system is dislosed comprising a satellite transponder 10 which receives a carrying signal from a conventional delay-measuring system 11 and transmits a triadic (three frequency) signal back to the delay-measuring system besides transponding the ranging signal. The triadic signal consists of a VHF signal at a frequency $f$ used in the conventional ranging system 11, mixed with a frequency $f_m$ to provide two additional frequencies $f+f_m$ and $f-f_m$ in the transmitted signal. Both of the latter frequencies are used with the carrier frequency $f$ to provide a second difference of phase shift $\Delta_2\phi$ for correction of the group delay (ranging time T by subtracting the excess group delay $\Delta T$ in accordance with the present invention.

The ranging system 11 comprises a transmitter-receiver 12 which transmits the ranging signal at the frequency $f$ to the satellite transponder 10, and simultaneously triggers a timing system 13 on. The signal received by the transponder triggers a ranging signal generator and a triadic signal generator there to transmit the three frequencies. Small-deviation phase modulation of a carrier can be used both for the ranging signal and the triadic signal. The carrier frequency received by the transponder 10 need not be the same as the transponded one.

The carrier of three frequecies as well as the transponded ranging signal, is received by the transmitter-receiver 12. The ranging signal is separated from the triadic signal in the receiver using conventional filter techniques and then used for triggering the timing system 13 off in a conventional manner. The triadic signal is fed to three filters 14, 15 and 16 which separate the three frequencies $f+f_m$, $f$ and $f-f_m$. The signals at frequencies $f+f_m$ and $f-f_m$ are then multiplied by the signal at frequency $f$ in conventional mixers 17 and 18. The outputs of the mixers are connected to a phase detector 19 by filters 20 and 21 which pass only the respective signals $f_m\ \phi_1$ and $f_m\ \phi_2$ produced by the mixers, where the subscripts $\phi 1$ and $\phi 2$ are used to distinguish the two distinct signals which are not in phase, but are otherwise of the same frequency $f_m$. The phase detector 19 produces a signal $\Delta_2\phi$ proportional to this phase shift between the signals $f_m\ \phi_1$ and $f_m\ \phi_2$.

It should be noted that the present invention may not only be employed in dispersive media other than the ionosphere, but also at electromagnetic wavelengths other than in the radio spectrum. Accordingly, reference to VHF and the ionosphere is not to be construed as a limitation of the invention, but simply as an example of one application of the invention.

The signal $\Delta_2\phi$ is proportional to $N_T$ given by Equation (4) and therefore proportional to the excess group delay $\Delta T$. Accordingly a value closely proportional to excess group delay can be determined directly by a multiplier 22 which multiplies the signal $\Delta_2\phi$ by a constant of proportionality equal to $-f/4\pi f_m^2$. The product $-\Delta T$ may then be added to the output (group delay T) of the ranging system to obtain a corrected range signal. The group delay T determined by the timing system 13 in this illustrative embodiment of the present invention is for the total round trip, while the excess group delay is for only the return trip. Accordingly, a divider 23 divides the total group delay by two. An adder 24 then produces the sum $T-\Delta T$ as the corrected delay which, when multiplied in a multiplier 25 by a conversion factor equal to the group velocity in a standard non-dispersive propagation medium (the speed of light for radio waves in free space), yields the desired range corrected for excess group delay.

The mathematical proof that the system of FIG. 1 provides an output T which is a group delay corrected on line (i.e., in real time) for excess group delay $\Delta T$ is as follows. Suppose RF phase shifts at $f+f_m, f$, and $f-f_m$ are $\phi_u$, $\phi_c$ and $\phi_l$, respectively. Then the second difference of phase shift is defined by $$\Delta_2\phi = (\phi_u - \phi_c) - (\phi_c - \phi_l)$$
$$= \phi_u + \phi_l - 2\phi_c \tag{5}$$

The second difference $\phi_2\phi$ estimates the curvature of the phase-shift-versus frequency curve of FIG. 2, arising from the ionospheric dispersion, and it is accurately proportional to $N_T$.

The "excess" phase shift in radians over the propagation path has a form similar to Equation (2):

$$\phi = -2\pi \frac{f}{c} \int_0^R \Delta n \, ds \tag{6}$$

The expression analogous to Equation (4) is $$\phi = -e^2 N_T / 4\pi\epsilon_0 mcf$$
$$= -8.42 \times 10^{-7} (N_T/f) \text{ radians} \tag{7}$$

Combining Equations (5) and (7) we have $$\Delta_2\phi = -\frac{e^2 N_T}{4\pi\epsilon_0 mc} \left[ \frac{1}{f+f_m} + \frac{1}{f-f_m} - \frac{2}{f} \right]$$
$$= -\frac{e^2 N_T}{2\pi\epsilon_0 mc} \left[ \frac{f_m^2}{f(f^2-f_m^2)} \right]$$

$$\Delta_2\phi \approx (-e^2/2\pi\epsilon_0 mc) N_T f_m^2/f^3$$
$$= -1.69 \times 10^{-6} N_T f_m^2/f^3 \text{ radians} \tag{9}$$

The relationship of $\Delta_2\phi$ to $\Delta T$ is, from Equations (4) and (9):

$$\Delta T = -\Delta_2\phi \, f/4\pi f_m^2 \text{ seconds} \tag{10}$$

Thus the excess group delay can be obtained accurately from $\Delta_2\phi$ and ranging corrections can be easily applied as described.

The measurement of $\Delta_2\phi$ is conceptually quite simple as described with reference to FIG. 1. The triadic signals may either be CW or pulsed (e.g., short bursts); the optimum spectrum is easily generated in practice by a low-deviation ($\approx b$ rad) phase-modulated transmitter. This may be accomplished by simply phase-modulating the carrier transmitted from the satellite transponder 10, as noted hereinbefore, using any suitable modulator of conventional design. Conventional amplitude modulation may also be employed, but that is less desirable because optimum division of power amongst members of the triad may not be achieved. In either case, the triadic signals can be generated by well known simple techniques.

In considering the possible requirements of a VHF $\Delta_2\phi$ range-correcting system, particularly those affecting the choice of $f_m$, there are contradictory requirements: the need to make fine-scale corrections and the desire to avoid $2\pi$ phase ambiguities. Fortunately, it appears possible to satisfy both at VHF with a single value of $f_m$. Suppose, for instance, that no $2\pi$ ambiguity can be tolerated in $\Delta_2\phi$ for $N_T$ less than $10^{19}$ electrons/m². ($10^{19}$ is almost never exceeded.) Then a measuring accuracy of 2° will resolve $N$ increments of $5.5 \times 10^{16}$ electrons/m². Equation (4) then shows that, at 135 MHz, it is possible to correct $\Delta T$ to within 0.4 $\mu s$, corresponding to range correction within 120 meters, which is about the resolution desired for navigation systems. For $f = 135$ MHz, the required spacing (for $\Delta_2\phi = 2\pi$ at $N_T = 10^{19}$) is $f_m = 960$ KHz, as calculated from Equation (9). In finer accuracy and/or longer unambiguous dynamic range should be required, more than one value of $f_m$ could be employed.

As an example of implementation, consider one-way transatmospheric propagation from a three-frequency transmitter in a geostationary sattelite. First, suppose it is desired to have a 99 percent confidence level that a single $\Delta_2\phi$ measurement will result in a correction to within an accuracy of 120 meters. At a frequency of 135 MHz, with a spacing of 960 KHz, the required rms phase-measurement error (in $\Delta_2\phi$) then is 0.78°.

Although the overall bandwith discussed above appears to be rather wide, the true spectral interval occupied by such a triad of spectral lines is actually very narrow. It can be on the order of only one to 10 Hertz around each of the three frequencies, depending on the length of the triadic signal burst and/or on the stability of the frequency source. It is worth emphasizing that the source need not be particularly stable for accurate measurements; only the relative stability between the members of the triad is important.

In the illustrative embodiment, the operations following the generation of the signal $\Delta_2\phi$ may be either analog or digital. If the latter, analog-to-digital converters would be provided at the outputs of the phase detector and the ranging system. Other requirements for implementation might depend on the particular ranging navigation system to which the present invention is applied. The required transmitter power and/or antenna gain, for instance, would depend upon the length of time available for a measurement.

It can be shown that the optimum division of transmitted power between the three frequencies for minimum overall power is one-half at the center frequency and one-quarter at each of the two side tones. For the optimum power-division situation, the variance of $\Delta_2\phi$ error is given by $$\phi_{rms}^2 = 8 \, k \, T/\tau \, P_{rec} \tag{11}$$

where $k$ = Boltzmann's constant = $1.38 \times 10^{-23}$ Joules/°K
$P_{rec}$ = Total received signal power $\tau$ = Averaging time
Now assume the following system parameters:
Now assume the following system parameters:
$G_T$ = Transmitting antenna gain = 18 $dB$
$R$ = Range = $4.2 \times 10^7$m
$G_R$ = Receiving antenna gain = 0 $dB$
$T$ = System noise temperature = 1,400° K. With the system parameters given above, combining Equation (13) with the bistatic radar equation yields the following relation between the total transmitted power, $P_T$, and the averaging time, $\tau$:

$$\tau P_T = 0.77 \text{ Joules}$$

In the above example, a 1-second averaging time requires only 0.77 watts to meet the requirements, yielding an rms range uncertainty of 47 meters. Thus the technique appears quite feasible and attractive from the required-power viewpoint.

One conceivable approach to applying the technique is nearly independent of the type of navigation system: a three-frequency (perhaps CW) transmitter would be placed aboard each of the satellites being used (alternatively, they could repeat a ground-generated triad) and all ground and user stations would more or less constantly monitor $\Delta_2\phi$ for each path. This implementation has the advantage of requiring relatively small amounts of power since a fairly long measurement time would be available. However, it has some disadvantage, notably the user's need for as many $\Delta_2\phi$ receivers as there are satellites. In navigation systems requiring the user to perform the computations (i.e., where the user has a computer), the relative cost of adding new receiver channels presumably would be less than in systems only requiring the user to resond to transmissions.

In the latter type of system, the simplest, most reliable and least expensive option could be for the user to include a three-frequency burst in his ranging response. Thus he would be relieved of the necessity for measuring $\Delta_2\phi$ or maintaining precision receivers; he would be required only to supply an accurate (in the sense of good $\Delta_2\phi$ stability) three-frequency transmitter, an apparently much easier task. In general, transponding systems would allow only a relatively short time (probably less than one second) for a $\Delta_2\phi$ measurement, increasing the power and gain requirement as compared with continuous monitor systems.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method of measuring dispersion of a signal transmitted through a dispersive propagation medium between first and second points comprising the steps of
    transmitting from said first point ot said second point a triadic signal of three distinct frequencies $f+f_m$, $f$ and $f-f_m$, where $f$ and $f_m$ are distinct frequencies,
    separating the frequencies of said triadic signal received at said second point into three distinct signals at said frequencies $f+f_m$, $f$ and $f-f_m$,
    mixing said three distinct signals with each other to obtain two distinct difference signals of the same frequency as the frequency differences $(f+f_m) - f$ and $f - (f-f_m)$,
    detecting the phase difference between said two difference signals to produce a signal which is closely proportional to said dispersion, and
    multiplying said signal proportional to said dispersion by a constant of proportionality to obtain an excess group delay value,
    wherein said constant of proportionality for an ionospheric propagation medium is equal to the value of $f$ divided by $4\pi f_m^2$.

2. A method of making an excess group-delay correction for ranging between first and second points using a signal transmitted through a dispersive propagation medium between said points comprising the steps of
    transmitting from said first point to said second point with said ranging signal at said first point a triadic signal of three distinct frequencies $f+f_m$, $f$ and $f-f_m$, where $f$ and $f_m$ are distinct frequencies,
    determining the transmission time of said ranging signal from said first point to said second point,
    separating the frequencies of said triadic signal received at said second point into three distinct signals at said frequencies $f+f_m$, $f$ and $f-f_m$,
    mixing said three distinct signals with each other to obtain two distinct difference signals of the same frequency as the frequency differences $(f+f_m) - f$ and $f - (f - f_m)$,
    detecting the phase difference between said two difference signals to produce a correction signal as the second difference of phase shift versus frequency, a value which is closely proportional to said excess group delay,
    multiplying said correction signal by a constant of proportionality to obtain an excess group delay value, and
    subtracting said value from said transmission time.

3. A method as defined in claim 2 wherein said constant of proportionality for an ionospheric propagation medium is equal to the value of $f$ divided by $4\pi f_m^2$.

4. Apparatus for measuring dispersion of a signal transmitted through a dispersive propagation medium comprising
    means for transmitting from said first point to said second point a triadic signal of three distinct frequencies $f+f_m$, $f$ and $f-f_m$, where $f$ and $f_m$ are distinct frequencies,
    means for separating the frequencies of said triadic signal received at said second point into three distinct signals at said frequencies $f+f_m$, $f$ and $f-f_m$,
    means for mixing said three distinct signals with each other to obtain two distinct difference signals of the same frequency as the frequency differences $(f+f_m) - f$ and $f - (f-f_m)$,
    means for detecting the phase difference between said two difference signals to produce a signal which is closely proportional to said dispersion, and
    means for multiplying said signal proportional to said dispersion by a constant of proportionality to obtain an excess group delay value,
    wherein said constant of proportionality is equal to the value of $f$ divided by $4\pi f_m^2$.

5. Apparatus for making an excess group-delay correction for ranging between first and second points using a signal transmitted through a dispersive propagation medium between said points comprising
    means for transmitting with said ranging signal from said first point a triadic signal to three distinct frequencies $f+f_m$, $f$ and $f-f_m$, where $f$ and $f_m$ are distinct frequencies, means for receiving said ranging signal at said second point and for producing a signal proportional to the transmission time of said ranging signal from said first point to said second point, means for separating the frequencies of said triadic signal received at said second point into three distinct signals at said frequencies $f+f_m$, $f$ and $f-f_m$, means for mixing said three distinct signals with each other to obtain two distinct difference signals of the same frequency as the frequency differences $(f+f_m) - f$ and $f - (f-f_m)$, means for detecting the phase difference between said two difference signals to produce a correction signal as the second difference of phase shift versus frequency, a value which is closely proportional to said excess group delay, means for multiplying said correction signal by a constant of proportionality to obtain a signal representing an excess group delay value, and means for subtracting said excess group delay signal from said signal proportional to said transmission time.

6. Apparatus as defined in claim 5 wherein said constant of proportionality for an ionospheric propagation medium is equal to the value of $f$ divided by $4\pi f_m^2$.

* * * * *

UNITED STATES PATENT OFFICE
CERTIFICATE OF CORRECTION

Patent No. 3,769,585          Dated October 30, 1973

Inventor(s) Edward Joseph Fremouw; Alan Alexander Burns, Jr.

It is certified that error appears in the above-identified patent and that said Letters Patent are hereby corrected as shown below:

In the Abstract, correct the equation in the last line thereof to read as follows, in agreement with the record in the Patent Office:

$$\Delta T = \frac{f}{4\pi f_m^2} \Delta_2 \phi$$

Signed and sealed this 2nd day of April 1974.

(SEAL)
Attest:

EDWARD M. FLETCHER, JR.
Attesting Officer

C. MARSHALL DANN
Commissioner of Patents